A. SEIPP.
STEERING CONTROL FOR MOTOR VEHICLES.
APPLICATION FILED JUNE 15, 1918.
1,333,738.
Patented Mar. 16, 1920.
2 SHEETS—SHEET 1.
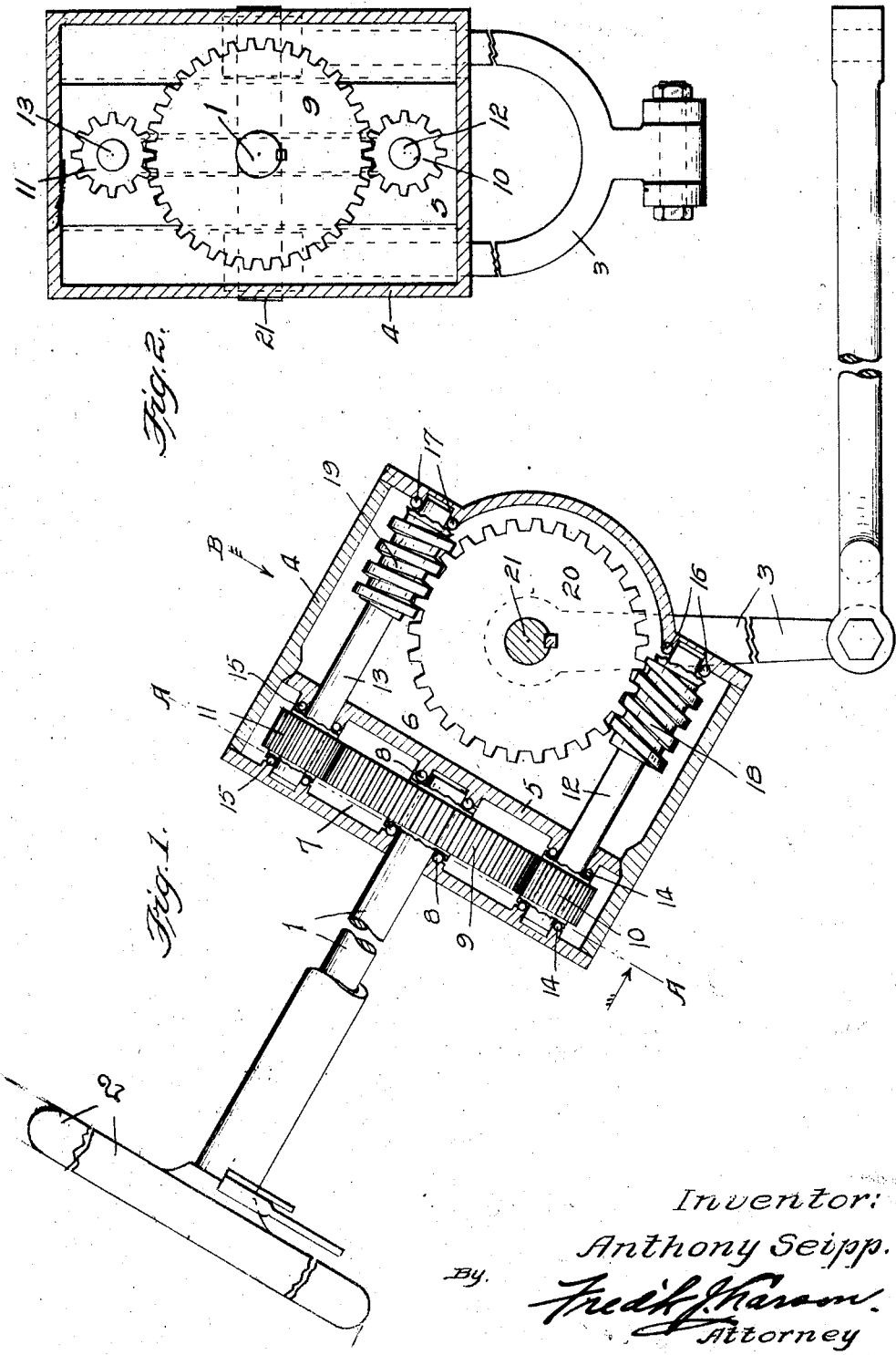
Inventor:
Anthony Seipp.
By
Fred'k J. Mason.
Attorney

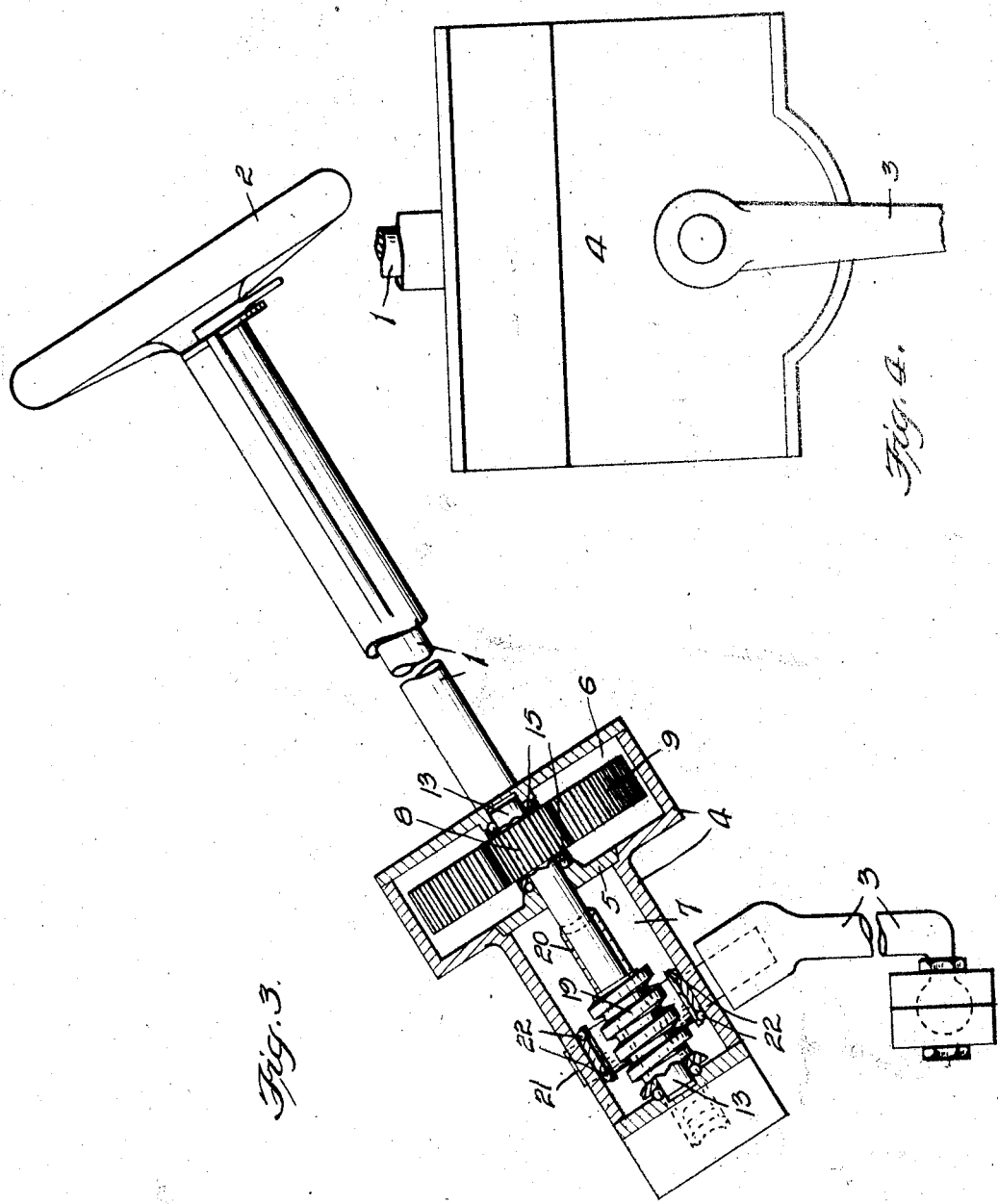

UNITED STATES PATENT OFFICE.

ANTHONY SEIPP, OF CASEYVILLE, ILLINOIS.

STEERING CONTROL FOR MOTOR-VEHICLES.

1,333,738.　　　Specification of Letters Patent.　　Patented Mar. 16, 1920.

Application filed June 15, 1918. Serial No. 240,157.

*To all whom it may concern:*

Be it known that I, ANTHONY SEIPP, a citizen of the United States, residing at Caseyville, in the county of St. Clair and State of Illinois, have invented a new and Improved Steering Control for Motor-Vehicles, of which the following is a specification.

My invention relates to improvements in steering controls for motor vehicles and has for its objects to provide improved means for readily imparting motion to the steering or oscillating arms for turning the front wheels of a vehicle, and to prevent the front wheels from imparting movement back to the hand-wheel of the steering-post when they roll over an uneven or rough road-bed.

A further object of the invention is to overcome certain important practical objections to, and defects in, the usual type of steering control now in use which permits the front wheels to impart motion back to the steering-post.

With the above and other objects in view, the invention consists in certain new and novel features of construction, arrangement and combination of parts, as will be more fully described in the following specification and finally pointed out in the claims hereto appended.

Referring to the accompanying drawings forming a part of this specification, wherein like characters of reference denote similar parts throughout the several views:

Figure 1, is a side elevation of a steering control constructed in accordance with my invention, the housing therefor being shown in section.

Fig. 2, is a top view of the steering control taken on line A—A of Fig. 1.

Fig. 3, is a view looking in direction of the arrow B, of Fig. 1, but showing a Ford steering-arm and cross-rod affixed thereto in lieu of the yoked steering-arm and connecting-rod shown in Fig. 1.

Fig. 4, is a side elevation of the device.

In carrying out the embodiment of my invention as illustrated in the accompanying drawings, I employ a steering-post 1, having a hand wheel 2, and provided with means whereby motion is imparted to any suitable design of steering-arm 3 by rotation of the steering-post 1. The lower end of the steering-arm 3 is connected to any suitable form of mechanism, whereby upon the oscillating movement of the steering-arm 3, through rotation of the steering-post 2, the front wheels of a vehicle will be moved to the right or left to guide the vehicle in the desired direction. It will here be understood, that it is impossible for the front-wheels to impart movement back to the steering-post 1, and hand-wheel 2, owing to the construction, arrangement and combination of gearing forming the important part of my invention, which connects the lower end of the steering-post 1 to the shaft to which the steering-arm 2 is fixed. The gearing is inclosed within a suitable housing or casing 4 having a dividing wall or partition 5 to form an upper chamber 6 and a lower chamber 7 to receive and protect the gearing against injury from contact with dust and foreign bodies.

As illustrated in Fig. 1, of the drawings, the lower end of the steering-post 1 extends into the upper chamber 7, of the housing 5, and is surrounded by means of ball or other bearings 8, so that the steering-post 1 may be rotated with ease through the steering or hand wheel 2. The lower end of the steering-post 1 is provided with a relatively large gear-wheel 9 which is adapted to mesh with two oppositely disposed pinions 10 and 11 which pinions are located in the upper chamber 7 and suitably fixed to the upper ends of the spaced shafts 12 and 13, respectively. The shafts 12 and 13 are surrounded at their upper end by means of ball or other bearings 14 and 15, respectively, and they lie parallel with the steering-post, as clearly shown in Fig. 1.

The lower end of the shafts 12 and 13 are surrounded by means of the ball or other bearings 16 and 17, respectively, and are provided with the worms 18 and 19, respectively. These two oppositely disposed worms 18 and 19, are adapted to mesh with a worm-gear 20 fixed to the transverse shaft 21. Shaft 21 is surrounded near each end with the ball or other bearings 22. Shaft 21 lies at a right-angle to the longitudinally disposed shafts 12 and 13 and the steering-post 1. The center of the shaft 21 is in a line with the center of the steering-post 1, as illustrated in Figs. 1 and 2.

It will be seen that the worm-gear 20 is disposed at a right-angle to the spur-gear 8.

The steering-arm 3 hereinbefore described is suitably fixed to one or both ends of the shaft 21, as desired.

It will be observed that it is impossible to turn the worms through the medium of the front wheels of a vehicle, as the double action of the opposed worms 18 and 19 in mesh with the worm-gear 20, substantially locks the gearing from motion, excepting when movement is imparted to the worm gear 20 through the steering-post 1 and intermediate-gearing.

The worms 18 and 19 are both of the same style thread and pitch, as is manifest.

To oscillate the steering arm 3, the steering-post 1 is rotated by means of the hand wheel 2 being turned either to the right or left, as desired. The gear 9 being fixed to the steering-post 1 causes it to rotate therewith and transmit motion from opposite sides thereof, to the pinions 10 and 11, which in turn, rotate shafts 12 and 13 and worms 18 and 19 fixed thereto, respectively. The worms in turn, transmit motion to the worm-gear 20 on opposite sides thereof, causing shaft 21 and the steering-arm 3 to move in the direction desired, as is manifest.

From the foregoing description, it will be seen that I provide a simple mechanism that is easily and quickly actuated for turning the front wheels of a vehicle by means of the steering-wheel and post and substantially locked against motion through the medium of the front wheels of a vehicle.

The many advantages of the hereindescribed invention will readily suggest themselves to those skilled in the art to which it appertains.

While I have illustrated and described the structure of device I now consider to be the best embodiment thereof, I desire to have it clearly understood that the steering control shown in the drawing is merely illustrative of a gearing having a double-action and I reserve the right to make any such changes or modifications as may fairly fall within the scope of the appended claims when fairly construed.

What I claim is:

1. In combination, a housing, a partition within the housing dividing the housing into an upper and lower compartment, a steering post, a pair of spaced shafts passing through said partition, a gear fixed to the lower end of the steering post within the upper compartment of the housing, a pinion fixed to the upper end of each shaft within the upper compartment of the housing, a steering arm shaft, a gear fixed to said steering arm shaft within the lower compartment of the housing, and a worm fixed to each of said spaced shafts within the lower compartment of the housing to oppositely engage the gear fixed to the steering arm shaft.

2. In combination, a housing having an upper chamber and a lower chamber, a steering post adapted to enter said upper chamber, a pair of longitudinally disposed shafts arranged in the lower chamber and adapted to enter the upper chamber, a transversely disposed shaft adapted to pass through said lower chamber, a steering arm fixed to said transversely disposed shaft, and a gearing control establishing a double action between the transversely disposed shaft and the steering-post and so arranged that the steering-post may transmit motion to the transversely disposed shaft to move the steering-arm but not permit the steering arm to impart motion through the gearing back to the steering-post.

In testimony whereof I have hereunto signed my name to the specification.

ANTHONY SEIPP.